(12) United States Patent
DeBusk

(10) Patent No.: US 7,510,660 B1
(45) Date of Patent: *Mar. 31, 2009

(54) CONTAMINANT REMOVAL METHOD FOR A BODY OF WATER

(76) Inventor: Thomas A. DeBusk, 3208 Westchester Dr., Cocoa, FL (US) 32926

(*) Notice: Subject to any disclaimer, the term of this patent is extended or adjusted under 35 U.S.C. 154(b) by 444 days.

This patent is subject to a terminal disclaimer.

(21) Appl. No.: 11/363,989

(22) Filed: Feb. 28, 2006

Related U.S. Application Data

(63) Continuation-in-part of application No. 10/656,545, filed on Sep. 5, 2003, now Pat. No. 7,014,776.

(51) Int. Cl.
*C02F 1/52* (2006.01)
*C02F 101/20* (2006.01)

(52) U.S. Cl. .................. 210/711; 210/714; 210/724; 210/727; 210/747; 210/906; 210/912

(58) Field of Classification Search .................. 210/711
See application file for complete search history.

(56) References Cited

U.S. PATENT DOCUMENTS

| | | | |
|---|---|---|---|
| 2,352,772 A | 7/1944 | Darby | |
| 3,579,443 A | 5/1971 | Horst | |
| 5,456,844 A | 10/1995 | Lobb | |
| 5,733,453 A | 3/1998 | DeBusk | |
| 5,766,474 A | 6/1998 | Smith et al. | |
| 5,993,649 A | 11/1999 | DeBusk et al. | |
| 6,251,264 B1 | 6/2001 | Tanaka et al. | |
| 6,413,426 B1 | 7/2002 | DeBusk et al. | |
| 6,692,641 B2 | 2/2004 | DeBusk et al. | |
| 6,837,994 B2 | 1/2005 | Izawa | |
| 7,014,776 B1 * | 3/2006 | DeBusk | 210/711 |

OTHER PUBLICATIONS

Lake Apopka Water Hyacinth Demonstration Project, Second Semi-Annual Report prepared for St. Johns River Water Management District, prepared by Amasek, Inc., Apr. 4, 1991.

DeBusk et al., "Effectiveness of Mechanical Aeration in Floating Aquatic Macrophyte-Based Wastewater Treatment Systems," Journal of Environmental Quality, vol. 18, No. 3, pp. 349-354, Jul.-Sep. 1989.

(Continued)

*Primary Examiner*—Peter A Hruskoci
(74) *Attorney, Agent, or Firm*—Jacqueline E. Hartt; Lowndes, Drosdick, Doster, Kantor & Reed, P.A.

(57) ABSTRACT

Pollutants, such as heavy metals, phosphorus, and pathogenic organisms, are removed from water by adding a chemical coagulant to water within an enclosure. With mixing, coagulation and flocculation occur, and a floc containing the pollutant settles to the enclosure bottom; so the treated water above the floc is free from at least some of the pollutant. Some of the treated water is removed from the enclosure, and new water is added. The new water and the settled floc are mixed to resuspend floc components. The process is repeated until the floc no longer exhibits contaminant-removal capability. In an alternate system, a matrix element is deployed within the enclosure, which captures a portion of the floc that settles within the water column. Pollutants in new water added to the enclosure encounter these suspended floc particles and are subsequently removed from the water.

22 Claims, 3 Drawing Sheets

OTHER PUBLICATIONS

Clark, Mark, "Biophysical Characterization of Floating Wetlands (Flotant) and Vegetative Succession of a Warm-Temperature Aquatic Ecosystem," Dissertation, University of Florida, 2000.

Wen, Li and Recknagel, Friedrich, "In Situ Removal of Dissolved Phosphorus in Irrigation Drainage Water by Planted Floats: Preliminary Results from Growth Chamber Experiment," Agriculture, Ecosystems and Environment, vol. 90, pp. 9-15, Jun. 2002.

Youngchul, Kim and Wan-Joong, Kim, "Roles of Water Hyacinths and Their Roots for Reducing Algal Concentration in the Effluent from Waste Stabilization Ponds," Water Research, vol. 34, No. 13, pp. 3285-3294, Sep. 1, 2002.

* cited by examiner

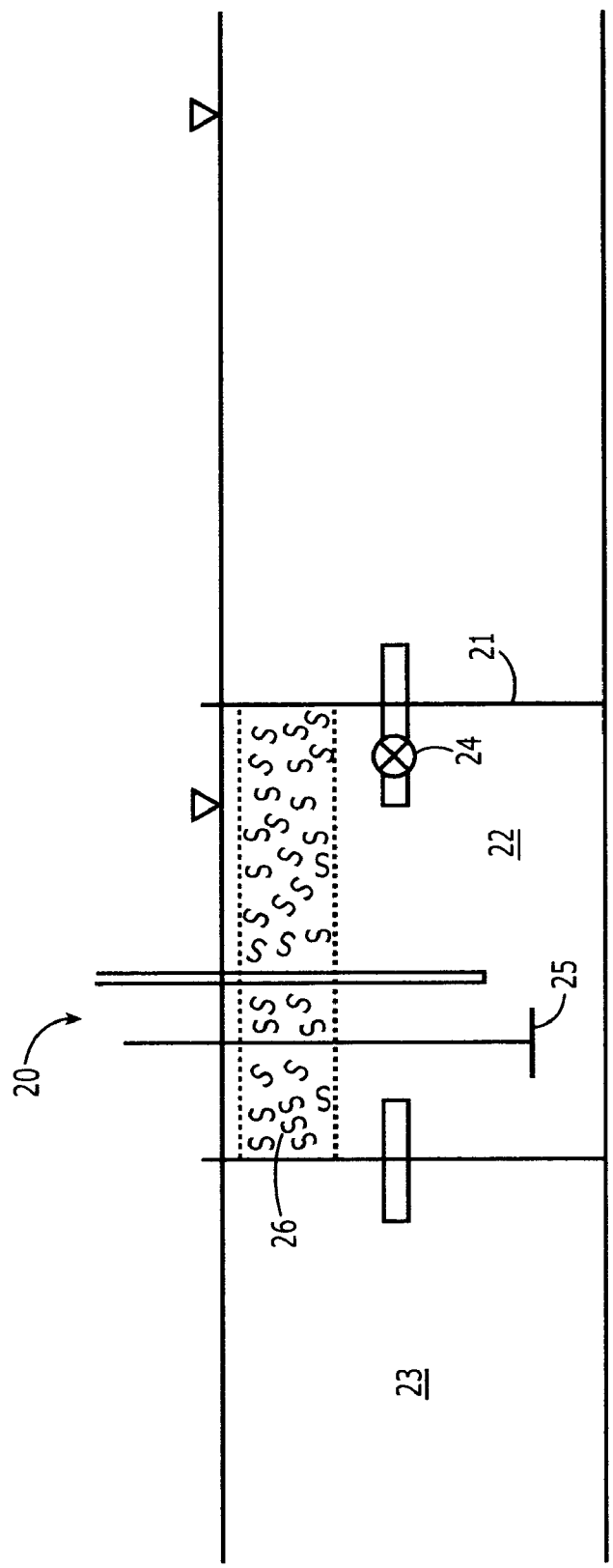

CONTAMINANT REMOVAL METHOD FOR A BODY OF WATER

CROSS-REFERENCE TO RELATED APPLICATION

This application is a continuation-in-part of application Ser. No. 10/656,545, filed Sep. 5, 2003, now U.S. Pat. No. 7,014,776, entitled "Contaminant Removal System and Method for a Body of Water."

BACKGROUND OF THE INVENTION

1. Field of the Invention

The present invention relates to systems and methods of water purification, and, more particularly, the control of nutrients, suspended and filamentous algae, pollutants, and toxins in a body of water.

2. Description of Related Art

Many freshwater lakes and ponds, as well as estuaries, are characterized, particularly during the warmer months, by certain contaminants, such as dissolved color, suspended solids, phosphorus, and heavy metals. Another site of contaminated water is the so-called "waste stabilization pond" (WSP), a body of water used to store industrial, municipal, agricultural wastewater or contaminated groundwater. The WSP is believed to be the most prevalent type of wastewater treatment technology in the world.

Chemical coagulants often are used in water treatment to remove contaminants from the water. In lake water treatment, for example, entire lakes or ponds may be treated with coagulants (typically the aluminum compound "alum"). These are added at or above a "critical" concentration, dictated by water chemical characteristics such as water pH and alkalinity, so that a floc forms. Contaminants in the water column are then encapsulated by, or adsorbed to, the floc, which then settles to the bottom of the lake.

It is also known in the art to treat wastewater with conventional "concrete and steel" chemical technologies, using separate chambers for: (1) adding and mixing coagulant; (2) rapid mixing to form flocs; and (3) clarifying to permit settling of flocs, subsequently allowing a clear supernatant to flow out from a port near the top of the vessel.

Alternatively, it is known to inject a coagulant into a water inflow pipe just prior to feeding the water into a lake. This may be accomplished, for example, using a flow proportional injection of coagulant into a stormwater inlet pipe, or by injecting the coagulant into a pipe as it feeds into a wetland. In these cases, the floc accumulates in the lake or wetland over time. In yet another method, prior to entering the lake the floc is fed into a clarification or separation vessel, where the floc is captured and disposed of in a sanitary sewer or is used for land application.

For the above-mentioned "concrete and steel" systems, the goal is to achieve a certain pollutant outflow concentration. For the chemical treatment of stormwater feeding into a lake or wetland, the goal is typically focused on mass (or percentage) removal of contaminants. In all cases, however, there is a clear incentive to minimize chemical dose to minimize cost. In cases in which the floc is captured, another goal is to maximize the settling rate of the floc, which minimizes the "carry-over" of floc from the clarifier, since effective floc settling reduces the required size of the clarifier.

SUMMARY OF THE INVENTION

The present invention is directed to a method and system for removing pollutants, such as heavy metals, phosphorus, and pathogenic organisms, from water. This invention capitalizes on the fact that coagulation and floc formation are dependent on the chemical characteristics of water (e.g., alkalinity, pH, dissolved organic matter) that are not necessarily related to the concentration of contaminants (e.g., phosphorus, heavy metals) desired to be removed from the water. The invention can utilize a plurality of approaches for exploiting this phenomenon. In a first system, a chemical coagulant is added to water containing a pollutant, the water being within an enclosure. The water and the coagulant are mixed, and coagulation and flocculation are permitted to occur. The mixing is stopped, and a floc formed by the coagulation and flocculation is permitted to settle to a bottom of the enclosure. The floc contains the pollutant, so that treated water remaining above the floc is thereby free from at least some of the pollutant.

At least some of the treated water is removed from the enclosure, and new water containing a pollutant is added to the enclosure. The new water and the floc are then mixed to resuspend components of the floc.

In a second system, a chemical coagulant is added to water containing a pollutant, the water being within an enclosure equipped with a matrix element. The water and the coagulant are mixed, and coagulation and flocculation are permitted to occur. The mixing is stopped, and a floc formed by the coagulation and flocculation is permitted to settle to a bottom of the enclosure, as well as onto the surfaces provided by the matrix element. The floc contains the pollutant, so that treated water remaining above the floc is thereby free from at least some of the pollutant.

At least some of the treated water is removed from the enclosure, and new water containing a pollutant is added to the enclosure. Pollutants in the newly added water encounter floc particles associated with the matrix element, which is deployed throughout the water column. Because these flocs still are somewhat "active" in terms of pollutant-removing capability, much of the pollutant mass subsequently is removed from the water. After several water exchanges, during which time the pollutant removal capability of these floc particles becomes depleted, another dose of coagulant is added to the enclosure and then mixed to form new flocs.

BRIEF DESCRIPTION OF THE DRAWING

FIG. 2 is a side cross-sectional view of an enclosure system of the present invention contained within a body of water.

DETAILED DESCRIPTION OF THE PREFERRED EMBODIMENTS

A description of preferred embodiments of the present invention will now be presented with reference to FIGS. 1A-3.

Figure 1A:
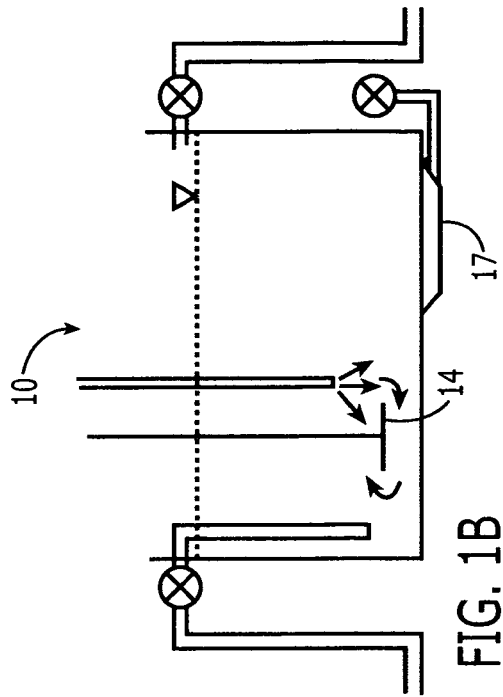
FIGS. 1A-1D is a side cross-sectional view of a vessel system of the present invention, with the method steps illustrated as (FIG. 1A) pumping water into the vessel; adding a coagulant, mixing, and permitting a floc to form (FIG. 1B); halting the mixing and permitting the floc to settle (FIG. 1C); and pumping the treated water out of the vessel (FIG. 1D).

A first embodiment of the method of the present invention, using the systems 10,20 of FIGS. 1A-2, respectively, comprises the steps, illustrated in FIGS. 1A-1D, of feeding water to be treated, which may contain such contaminants as suspended solids, phosphorus, heavy metals, and pathogenic organisms, into an enclosure, which can be a free-standing tank 11 that holds the water to be treated 12 or an enclosure 21 that compartmentalizes a discrete water column 22 within a body of water 23 such as a lake. The feeding step (FIGS. 1A and 2) is typically performed by a pump 13,24, although this is not intended as a limitation, as a gravity-fed system may also be envisioned by one of skill in the art. The pump may be positioned within the enclosure 21 (pump 24 in FIG. 2) or outside the enclosure 11 (pump 13 in FIGS. 1A-1D).

Figure 1B:
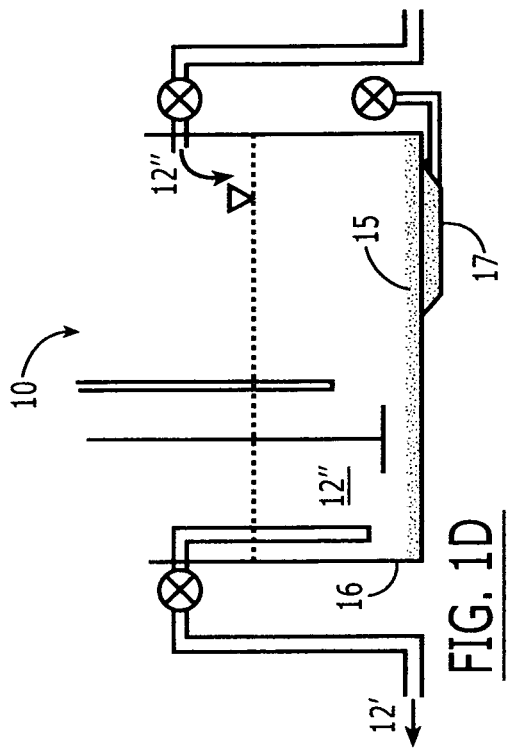
Figure 1C:
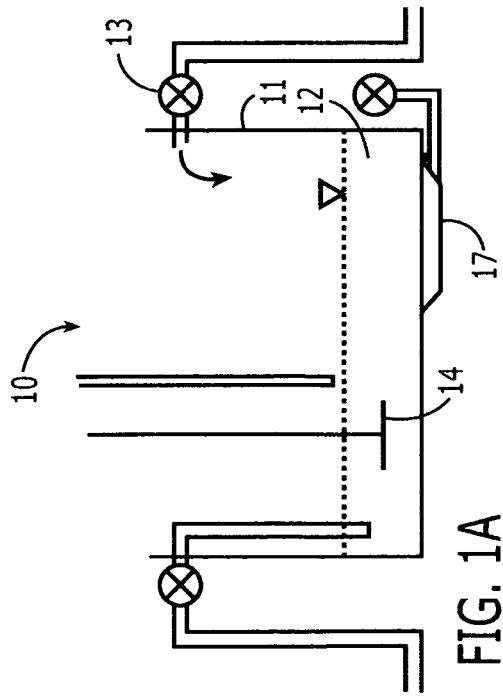
Figure 1D:
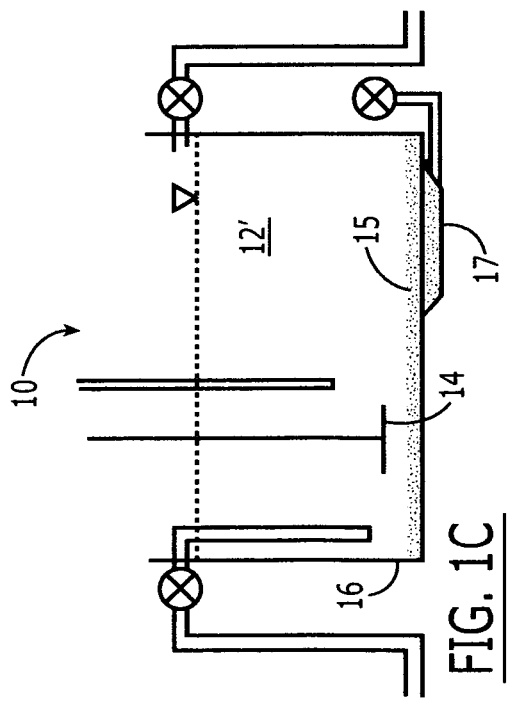

Next a chemical coagulant, such as an aluminum or iron compound (with chemical pH buffers or coagulant aids, as needed), is added to the enclosure 11,21. The fluid in the enclosure is mixed using a mixing means 14,25, allowing coagulation and flocculation to occur (FIG. 1B). The mixing is stopped, and the floc 15 is allowed to settle to the bottom 16 of the enclosure 11, resulting in the removal of various pollutants from the water, which now reside in the floc 15 in the bottom of the enclosure 11.

Once the floc 15 is settled (FIG. 1C), the treated water column 12' above the floc layer 15 is removed (FIG. 1D) and replaced with a fresh aliquot 12" of contaminated water. This exchange may occur either quickly or slowly, and in a batch or continuous-flow basis. The floc 15 is left in place on the bottom 16 of the enclosure 11 during the exchange. Once the water exchange has been completed, the floc 15 is resuspended throughout the "fresh" water column 12" by mixing the water in the enclosure 11.

Depending on the original concentration of the coagulant added, as well as the concentration of contaminants of the water, it is now likely that the resuspended floc 15 has additional capability to remove contaminants. The mixing is then stopped, and the new floc is allowed to settle to the bottom 16 of the enclosure 11. This process, including water exchange, resuspension of floc, and settling of floc, is repeated for several iterations, for as long as the floc continues to exhibit contaminant removal capability.

The floc ultimately is removed from the enclosure when its contaminant-removal capacity is exhausted, such as by pumping. In the case of enclosure 11, the vessel contains a sump 17 positioned adjacent the vessel's bottom 16 from which settled floc may be pumped at predetermined intervals.

Enclosure 31 in another embodiment of the system 30 (FIG. 3) may comprise, for example, a flexible barrier having sides but no bottom. The bottom 32 here is thus the bottom of the body of water 33. The barrier 31 may be movable, in which case the process is carried out for a predetermined time with the barrier 31 at a first position 34. Following the predetermined time, the barrier 31 is moved to a second position 35 within the body of water 33 spaced apart from the first position 34, leaving the settled floc 38 at the first position 34 on the bottom 32.

In order to provide additional surface area, a matrix element may be added to the enclosure. The matrix element serves to provide a surface onto which floc can settle, this settled floc then providing additional floc-containing surface area in position to contact water to be treated.

In the embodiment 20 of FIG. 2, the matrix element 26 in one embodiment can comprise a plastic "trickling filter media" or baffle such as are known in the art. In another embodiment, the matrix element 26 can comprise a bristle media filter, such as typically used for air filtration. In the embodiment 30 of FIG. 3, the matrix element comprises a root mat 36 of floating vegetation 37, which can, for example, be pre-inoculated with floc.

Figure 3:
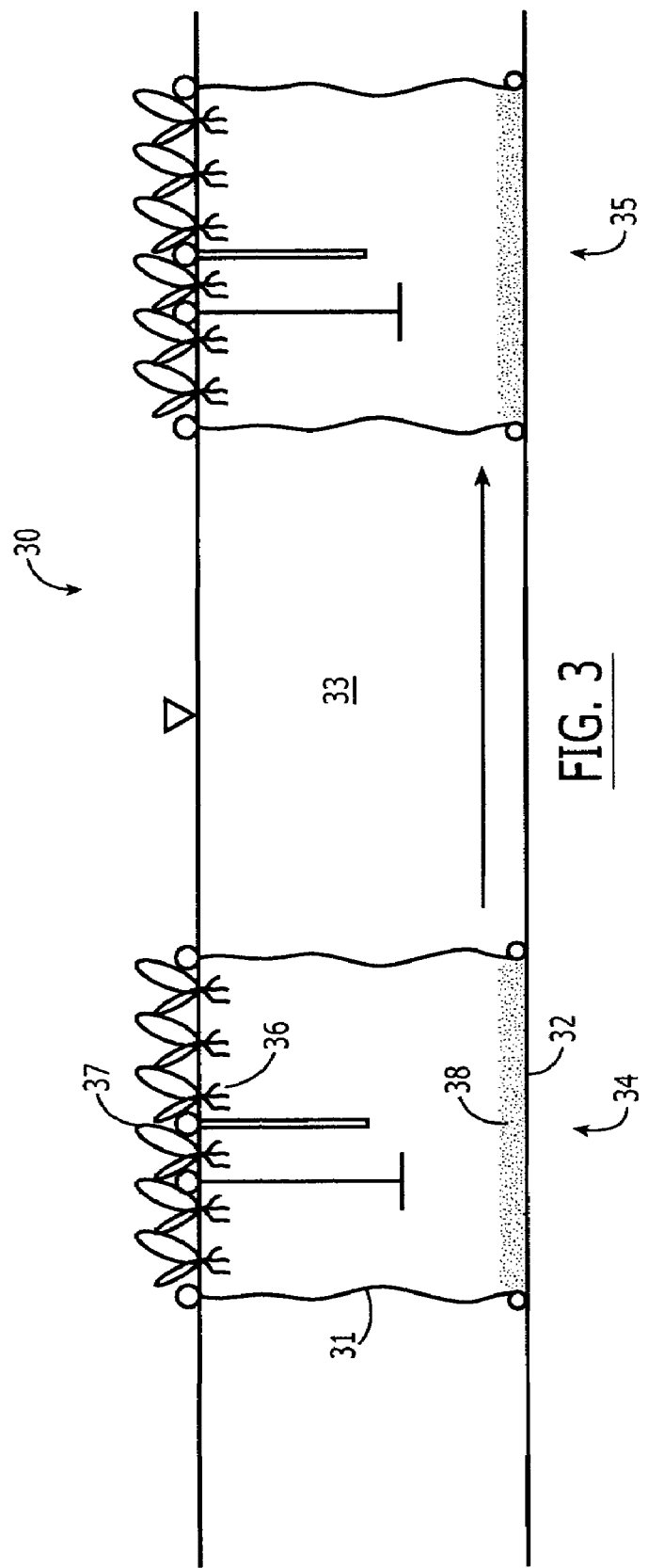
FIG. 3 is a side cross-sectional view of a second embodiment of the present invention.

In the embodiment 30 of FIG. 3, if the body of water 33 has a natural (e.g., soil, sand) bottom 32, the body of water 33 may be periodically drained, and the vegetation 37, floc associated with the root mat 36, and settled floc 38 on the bottom 32 tilled into the natural bottom 32.

In all cases, the overall process is re-started by adding coagulant dose (similar to the original dose) to a fresh parcel of water, thereby forming a "new" aliquot of floc.

Under certain circumstances, the contaminant removal performance of the resuspended floc can be enhanced by adding a small dose of pH buffer, coagulant aid (e.g., a polymer), and/or coagulant (typically at a much lower concentration than the original dose), upon resuspension of the floc in the enclosure.

The method may be performed "manually" or under electronic control, wherein the pumping and mixing elements are under timer control and are coordinated to perform the method steps automatically.

One of the benefits of this invention is that by harnessing the "additional" contaminant removal capability of a previously formed and settled floc through its subsequent resuspension, the mass of pollutant removed per unit mass of coagulant added can be maximized. This represents a cost savings (reduction in operating costs for coagulant purchase), and in many circumstances, an environmental benefit (reduction of coagulant/floc that ultimately is discharged to the environment).

Another benefit of the current systems and methods is that only one enclosure is required, since it is not critical to achieve a predetermined target outflow concentration.

One of skill in the art will recognize that each body of water and its components will have its own characteristics. Therefore, each site will be evaluated to determine individual design and operational variables, including, but not intended to be limited to, type and dose of coagulant, buffers and coagulant aids; frequency of water exchange; frequency of floc resuspension; dose of additional coagulant, buffer and coagulant aids, at the time of floc resuspension; and method of removing floc.

What is claimed is:

1. A method for treating water comprising the steps of:
   (a) adding a chemical coagulant to water containing a pollutant, the water within an enclosure, the enclosure including a matrix element for providing additional surface area within the enclosure, wherein the matrix comprises one of a baffle, a bristle media filter, and a filter media;
   (b) mixing the water and the coagulant;
   (c) permitting coagulation and flocculation to occur;
   (d) stopping the mixing;
   (e) permitting a floc formed by the coagulation and flocculation to settle to a bottom of the enclosure and onto the matrix element, the floc containing the pollutant, the matrix element providing additional floc-containing surface area to contact the water within the enclosure, treated water remaining above the floc thereby free from at least some of the pollutant;
   (f) removing at least some of the treated water from the enclosure;
   (g) adding new water containing a pollutant to the enclosure; and
   (h) mixing the new water and the floc to resuspend components of the floc.

2. The method recited in claim 1, further comprising the steps of:
   (i) repeating steps (c)-(h) until a contaminant removal capability of the coagulant is substantially exhausted;
   (j) permitting the floc to settle to the enclosure bottom; and
   (k) removing the floc from the enclosure.

3. The method recited in claim 2, further comprising the step, following step (k), of adding a second dose of coagulant to the enclosure, and repeating steps (b)-(k).

4. The method recited in claim 1, further comprising the step, following step (h), of adding to the enclosure at least one of a pH buffer, a coagulant aid, and a coagulant.

5. The method recited in claim 1, wherein the coagulant comprises at least one of an aluminum or an iron compound.

6. The method recited in claim 1, wherein the pollutant comprises at least one of a suspended solid, phosphorus, a heavy metal, and a pathogenic organism.

7. The method recited in claim 1, wherein the enclosure comprises a vessel, and further comprising the step, prior to step (a), of pumping the water containing a pollutant into the vessel.

8. The method recited in claim 7, wherein step (g) comprises pumping the new water into the vessel, and step (f) comprises pumping the treated water out of the vessel.

9. The method recited in claim 8, wherein steps (f) and (g) are performed in one of a batch mode or a substantially continuous mode.

10. The method recited in claim 7, further comprising the steps of:
(i) permitting the floc to settle into a sump positioned adjacent a bottom of the vessel; and
(j) at predetermined intervals pumping the settled floc out of the sump.

11. The method recited in claim 1, wherein the enclosure comprises a discrete column of water within a body of water.

12. The method recited in claim 11, wherein step (g) comprises pumping the new water into the water column from the body of water, and step (f) comprises pumping the treated water out of the water column into the body of water.

13. The method recited in claim 12, wherein steps (f) and (g) are performed in one of a batch mode or a substantially continuous mode.

14. The method recited in claim 11, wherein the enclosure comprises a movable, substantially vertical barrier located at a first position within the body of water, a bottom of the water column comprising a bottom of the body of water, and further comprising the steps of:
(i) permitting the floc to settle to the water body bottom; and
(j) periodically moving the vertical barrier to a second position within the water body spaced apart from the first position, leaving the settled floc at the water body bottom of the first location.

15. A method for treating water comprising the steps of:
(a) adding a chemical coagulant to water containing a pollutant, the water within an enclosure, the enclosure including a matrix element for providing additional surface area within the enclosure;
(b) mixing the water and the coagulant;
(c) permitting coagulation and flocculation to occur;
(d) stopping the mixing;
(e) permitting a floc formed by the coagulation and flocculation to settle to a bottom of the enclosure and onto the matrix element, the floc containing the pollutant, the matrix element providing additional floc-containing surface area to contact the water within the enclosure, treated water remaining above the floc thereby free from at least some of the pollutant;
(f) removing at least some of the treated water from the enclosure;
(g) adding new water containing a pollutant to the enclosure;
(h) permitting the new water containing the pollutant to contact the matrix element; and
(i) repeating steps (f)-(h) until the coagulant has substantially no further contaminant-removal capability.

16. The method recited in claim 15, further comprising the step, following step (h), of adding to the enclosure at least one of a pH buffer, a coagulant aid, and a coagulant.

17. The method recited in claim 15, wherein the coagulant comprises at least one of an aluminum or an iron compound, and the pollutant comprises at least one of a suspended solid, phosphorus, a heavy metal, and a pathogenic organism.

18. The method recited in claim 15, wherein the enclosure comprises a vessel, and further comprising the step, prior to step (a), of pumping the water containing a pollutant into the vessel.

19. The method recited in claim 15, wherein the enclosure comprises a discrete column of water within a body of water.

20. The method recited in claim 15, wherein the matrix comprises a root mat of floating vegetation.

21. The method recited in claim 20, further comprising the step, prior to step (a), of inoculating floc onto the root mat.

22. The method recited in claim 15, wherein the matrix comprises one of a baffle, a filter media, and a bristle media filter.

* * * * *